United States Patent
Jones et al.

(10) Patent No.: US 7,608,963 B2
(45) Date of Patent: Oct. 27, 2009

(54) CRIMPED ROTOR FOR AN ELECTRIC BRUSHLESS DIRECT CURRENT MOTOR

(75) Inventors: Robert M. Jones, 3117 Endsley Rd., Brooksville, FL (US) 34609; Joseph M. Lisiecki, Springhill, FL (US)

(73) Assignee: Robert M. Jones, Brooksville, FL (US)

( * ) Notice: Subject to any disclaimer, the term of this patent is extended or adjusted under 35 U.S.C. 154(b) by 354 days.

(21) Appl. No.: 11/800,715

(22) Filed: May 7, 2007

(65) Prior Publication Data

US 2007/0296297 A1    Dec. 27, 2007

Related U.S. Application Data

(60) Provisional application No. 60/799,111, filed on May 10, 2006.

(51) Int. Cl.
*H02K 1/30* (2006.01)
(52) U.S. Cl. ............... 310/156.28; 310/156.25
(58) Field of Classification Search ........... 310/156.28, 310/156.25, 156.43, 156.55, 112, 114, 71, 310/49 R, 179, 180
See application file for complete search history.

(56) References Cited

U.S. PATENT DOCUMENTS

| | | | |
|---|---|---|---|
| 3,809,990 A | 5/1974 | Kuo, et al. | |
| 4,035,677 A | 7/1977 | Kusayama et al. | |
| 4,394,594 A | 7/1983 | Schmider et al. | |
| 4,777,397 A | 10/1988 | Parshall | |
| 4,972,112 A * | 11/1990 | Kim | 310/181 |
| 5,008,572 A | 4/1991 | Marshall et al. | |
| 5,140,210 A | 8/1992 | Shirakawa | |
| 5,347,191 A | 9/1994 | Wood | |
| 5,554,900 A | 9/1996 | Pop, Sr. | |
| 5,710,474 A * | 1/1998 | Mulgrave | 310/254 |

(Continued)

FOREIGN PATENT DOCUMENTS

JP    6 193583    7/1994

(Continued)

OTHER PUBLICATIONS

Brushless DC Motor, <URL: www.freescale/com>, downloaded Feb. 5, 2007.

(Continued)

*Primary Examiner*—Michael C Zarroli
(74) *Attorney, Agent, or Firm*—Hamilton, Brook, Smith & Reynolds, P.C.

(57) ABSTRACT

A rotor having a substantially cylindrical configuration for use in a brushless direct current electric motor having a high torque to size ratio. The rotor has an outer peripheral surface. The rotor also has a central rotor shaft and a first and second retaining ends mounted on the central rotor shaft and spaced from one another. The rotor also has a plurality of magnets configured to provide a magnetic flux with a stator disposed around the central rotor shaft. The magnets are radially disposed on the shaft and the rotor also has a sheath. The sheath is crimped around the radially disposed permanent magnets, and holds the magnets around the shaft. The sheath is lightweight and minimizes a gap between the permanent magnets and the stator to provide for an electromagnetic flux between the magnets and the stator windings, and for rotation of the central rotor shaft.

9 Claims, 6 Drawing Sheets

U.S. PATENT DOCUMENTS

| | | | |
|---|---|---|---|
| 5,789,831 A | 8/1998 | Kregling | |
| 5,861,693 A | 1/1999 | Takahashi | |
| 5,929,547 A | 7/1999 | Kim | |
| 5,982,074 A | 11/1999 | Smith et al. | |
| 6,153,957 A * | 11/2000 | Takano | 310/71 |
| 6,621,189 B1 | 9/2003 | Flynn | |
| 6,700,270 B2 | 3/2004 | Yanashima et al. | |
| 6,844,647 B2 * | 1/2005 | Horber | 310/156.43 |
| 6,888,279 B2 | 5/2005 | Haner | |
| 6,906,443 B2 * | 6/2005 | Luo et al. | 310/156.47 |
| 6,909,215 B2 | 6/2005 | Bryant | |
| 6,924,579 B2 | 8/2005 | Calley | |
| 6,992,418 B2 | 1/2006 | Hans | |
| 7,051,421 B2 | 5/2006 | Biais et al. | |
| 7,057,326 B2 | 6/2006 | Ren et al. | |
| 7,129,608 B2 | 10/2006 | Eppler et al. | |
| 7,144,468 B2 | 12/2006 | Decristofaro et al. | |
| 7,504,752 B2 * | 3/2009 | Head | 310/87 |
| 2006/0244333 A1 * | 11/2006 | Jeung | 310/186 |

OTHER PUBLICATIONS

Kikuchi, T. and Kenjo, T., "A Unique Desk-top Electrical Machinery Laboratory for the Mechatronics Age," *IEEE*, pp. 1-20, (1997),<URL: www.ewh.ieee.org> downloaded Feb. 5, 2007.

Luk, P.C.K., and Jinupon, K. P., "Direct Work Control for a Three-Stack Switched Reluctance Motor," *IEEE*, 0-7803-9033:24622466 (2005).

* cited by examiner

CRIMPED ROTOR FOR AN ELECTRIC BRUSHLESS DIRECT CURRENT MOTOR

CROSS REFERENCE TO RELATED APPLICATIONS

This application claims the benefit of U.S. Provisional Application No. 60/799,111 filed on May 10, 2006. This application also is related to U.S. patent application Ser. No. 11/800716, entitled "ELECTRIC MACHINE HAVING SEGMENTED STATOR", which is being filed concurrently herewith. The entire teachings of the above applications are incorporated herein by reference.

BACKGROUND

A motor is an electromechanical device which converts electrical energy, delivered in the form of voltages or currents, into mechanical energy that is represented as rotational movement. The electromechanical force is described by the Lorentz force law. A motor includes a stator and a rotor. The stator typically includes a wire coil having a number of windings that receive a driver current.

The rotor typically includes a series permanent magnets. The rotor and stator are mechanically arranged such that the rotor can move freely with respect to the fixed stator. Electromagnetic interaction, or an electromagnetic flux exists between the stator and rotor. The rotor rotates because the stator winding and the magnetic field are arranged so a mechanical force, or torque is developed around the rotor axis. This causes the rotor to move for each polarity change in the stator windings. A generator, or dynamo may be constructed in a similar fashion.

The rotor assembly typically is made from a number of electromagnets spaced about a shaft. Typically, the magnets are contained in slots formed on the shaft, such as, the rotor disclosed in U.S. Pat. No. 5,554,900 to Pop, Sr., which is herein incorporated by reference in its entirety. Then, the rotor assembly is rotatably supported mechanically within the stator housing by low friction bearings, in a so called "in-runner" configuration.

Often, to support the magnets, these slots that receive the magnets are detrimental. The slots house the magnets, which are spaced far from the windings in operation. This excessive spacing or gap lessens or reduces the electromagnetic flux between the permanent magnets and the stator windings.

Moreover, it is costly to manufacture a rotor having a number of slots. Tight tolerances between the rotor and the magnets must be ensured so that the permanent magnets are properly supported in the slots, and will stay stationary relative to the rotor shaft during fast rotation of the rotor.

SUMMARY

A rotor having a substantially cylindrical configuration for use in a motor having a high torque to size ratio. The rotor includes an outer peripheral surface. The rotor has a central rotor shaft and a first and second retaining ends located on the central rotor shaft and spaced from one another. The rotor also has a plurality of magnets configured to provide a magnetic flux with a stator disposed around the central rotor shaft. The magnets are radially disposed on the shaft. The rotor also has a sheath crimped around the radially disposed permanent magnets holding the magnets around the shaft. The sheath is lightweight and minimizes a gap between the permanent magnets and the stator. This provides for an electromagnetic flux between the magnets and the stator windings.

The rotor has permanent magnets radially surrounding the rotor shaft. The sheath can be made from a non-magnetic metal, or a thermoplastic material. The shaft includes an end that is configured to translate rotational movement to a gear. The rotor shaft can be, and is not limited to, a cylindrical six sided member. The plurality of magnets may be received on each of the six sides. The rotor has a second plurality of second permanent magnets. These magnets are disposed along the longitudinal axis forming a second phase. The plurality of magnets can form at least three rotational phases on the rotor shaft.

The plurality of magnets form a first phase, a second phase and a third phase along the rotor shaft. The first phase (that includes the plurality of magnets) surround the rotor shaft in a first location. The sheath surrounds the plurality of magnets of the first phase. The second phase also has the plurality of magnets surrounding the rotor shaft in a second location. The second location is separated from the first location. A second sheath surrounds the plurality of magnets of the second phase.

The rotor has the third phase with a third plurality of magnets surrounding the rotor shaft in a third location. The third location is separated from the second location. A third sheath surrounds the plurality of magnets of the third phase. The rotor can have the permanent magnets of the first through third phases held by first through third respective sheaths made from a crimped material.

In another aspect, the rotor has a substantially cylindrical configuration for use in an electric motor having a high torque to size ratio. The rotor has an outer peripheral surface. The rotor includes a central rotor shaft with first through sixth receiving surfaces. The first phase of magnets is configured to provide a magnetic flux with a stator. The first phase of magnets includes at least six magnets disposed around each of the first through sixth receiving surfaces of the central rotor shaft at a first location. The sense of the magnets alternates for each of the phases. The rotor also has a second phase of magnets. The second phase is configured to provide a magnetic flux with the stator. Likewise, the second phase of magnets includes at least six magnets disposed around each of the first through sixth receiving surfaces of the central rotor shaft at a second location. The second location is spaced apart from the first location.

Moreover, the rotor also has a third phase of magnets that is configured to provide a magnetic flux with the stator. The third phase of magnets includes at least six magnets disposed around each of the first through sixth receiving surfaces of the central rotor shaft at a third location. The third location is spaced from the second first location. The second location is positioned between the first and the third locations. A collared device is configured to retain each of the first through third phases of magnets on the central rotor shaft. The collared device also provides a minimum gap distance between the first through third phases of magnets and the stator.

The collared device can be a sheath that radially extends around the central rotor shaft. The device may also further include a first crimped sheath that surrounds the first phase of magnets. Additionally, a second crimped sheath can surround the second phase of magnets. Further, a third crimped sheath can surround the third phase of magnets. The first through third phases of magnets are permanent magnets.

In yet another embodiment, an electric motor having a high torque to size ratio includes a rotor having a central longitudinal axis of rotation, a stator defining a centrally located longitudinal opening and a bearing for supporting the rotor in the stator and for allowing the rotor to rotate about the central longitudinal axis of rotation. The rotor has a central rotor shaft with first through sixth receiving surfaces. A first phase of magnets is configured to provide a magnetic flux with the stator. The first phase of magnets includes at least six magnets. They are disposed around each of the first through sixth receiving surfaces of the central rotor shaft at a first location.

The motor also has a second phase of magnets. The second phase is configured to provide a magnetic flux with the stator. The second phase of magnets include at least six magnets disposed around each of the first through sixth receiving surfaces of the central rotor shaft at a second location. The second location may be spaced from the first location.

A third phase of magnets is configured to provide a magnetic flux with the stator with the third phase of magnets including at least six magnets. The magnets are disposed around each of the first through sixth receiving surfaces of the central rotor shaft at a third location. The third location is spaced from the second first location with the second location being between the first and the third locations. The motor also includes a plurality of sheaths. The sheaths are configured to retain each of the first through third phases of magnets on the central rotor shaft. The sheaths also provide a minimum gap distance between the first through third phases of magnets and the stator.

Each of the first through third phases of magnets may be connected to the respective first through sixth receiving surfaces. Each of first through third phases of magnets also can be offset from one another by a predetermined amount and heat resistant, and held in place by the sheaths in the offset configuration.

In yet another embodiment, there is provided a method of connecting magnets to a rotor output shaft. The method includes placing at least two magnets on a planar surface of the rotor shaft in an alternating north-south configuration and crimping a material to surround and hold the magnets in place to provide an electromagnetic flux between a stator winding and magnets.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
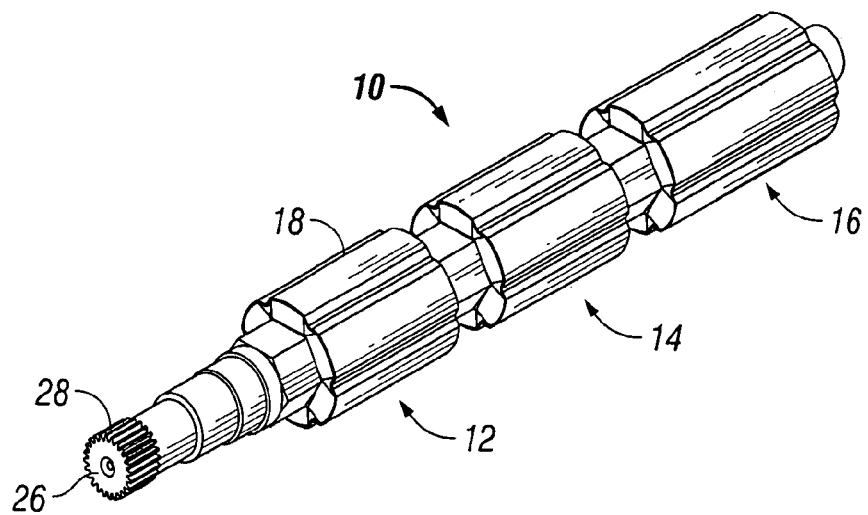
FIGS. 1 through 3 show a perspective view, a side view and a front view of a rotor according to the present invention.

Turning to FIG. 1, there is shown a perspective view of a rotor 10 according to the present disclosure. The present rotor 10 can be used with electric motors where precise speed control is necessary. The rotor 10 is configured for a use with brushless direct current electric motor having high torque. Preferably, the rotor 10 is a cylindrical shaped member having a number of permanent magnets in a first phase 12, a second phase 14, and a third phase 16 positioned along the length of the rotor 10. The first through third phases 12, 14, and 16 electromagnetically link to a stator 100 (FIG. 5) across an air gap that is disposed between the rotor 10 and the stator 100 when the rotor 10 is rotatably supported in the stator 100. The rotor 10 and stator 100 form an electric motor. In this aspect, the rotor 10 includes a support device 18, or sheath that retains at least one or all the magnets of first through third phases 12, 14, and 16. The sheath 18 supports the magnets on the rotor 10 in a manner that (i) minimizes the air gap between the stator 100 and the rotor 10, yet (ii) maximizes an electromagnetic flux and also (iii) minimizes a parasitic effect of an excessively spaced air gap defined between the magnets and the stator windings to permit rotation of the rotor shaft.

This minimal air gap between the rotor 10 and the stator 100 is advantageous. A maximum amount of electromagnetic flux from the stator 100 to the rotor 10 can be achieved without parasitic losses due to a large air gap. A small or minimum gap distance ensures that high current passing through the windings of the stator 100 provides a strong electromagnetic field that will rotate the rotor 10. This sheath 18 also ensures a stable rotor rotational structure, while a maximum amount of mechanical rotational energy is converted from the electrical energy of the stator 100.

Figure 2:
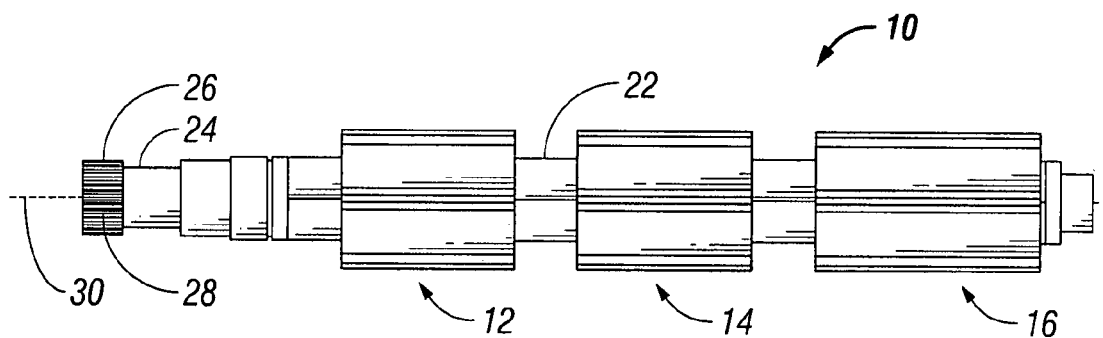
Figure 3:
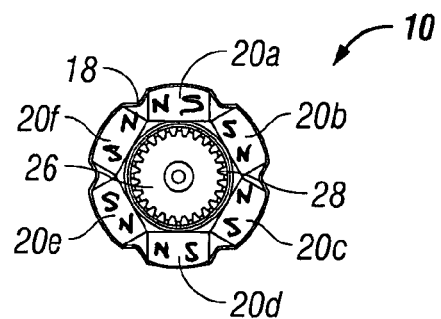

Turning to FIGS. 2 and 3, there is shown a side view of the rotor 10. A structure of the rotor 10 will be explained. The rotor 10 includes a first phase 12. The first phase 12 includes six permanent magnets, or a first permanent magnet 20a, a second permanent magnet 20b, a third permanent magnet 20c, a fourth permanent magnet 20d, a fifth, and a sixth permanent magnet 20e, and 20f. Each of the permanent magnets 20a through 20f are disposed in an alternating north-south, south-north, north-south, south-north, north-south, south-north arrangement around an outer receiving surface 22 of the rotor 10. The rotor 10 is preferably a cylindrical structure that includes a receiving face, or planar surface for each of the permanent magnets 20a through 20f. In that aspect, the rotor 10 include a six-sided, hexagonal polygonal structure when taken along a side view of the rotor 10 to receive each of the magnets 20a through 20f as shown in FIG. 3.

A hexagonal polygonal cross sectioned view is, of course, shown for a rotor 10 having six permanent magnets 20a through 20f, however, it should be appreciated that this hexagonal configuration is not limiting. It is envisioned that the rotor 10 of the present disclosure may have a planar face 22 for each different permanent magnet configuration. The rotor 10 may include five planar receiving faces 22 for five permanent magnets, or four receiving faces 22 for four permanent magnets, and is not limited to any specific configuration or number of permanent magnets 20a through 20f or complementary receiving faces 22. The rotor 10 may have a pentagon, square, or triangular cross section, or more than six sides.

As shown on FIG. 2, at a distal end 24 of the rotor 10, the rotor 10 includes a geared end 26. The geared end 26 includes a plurality of teeth 28. Geared end 26 is preferably configured to translate the output of the combined rotor 10 and stator 100 to an output. Namely, the rotational torque output of the motor stator 100 is communicated to another structure, such as a wheel, or compressor, or fan impeller. It should be appreciated that the rotor 10 is not limited to any specific device for use, and the rotor 10, may be used with any electric motor, or any powered device using an electric motor, or alternatively any generator or dynamo known in the art. The geared end 26 preferably includes a plurality of teeth 28 that engage another planetary gear (not shown) to translate torque developed about a rotor axis 30 to the planetary gear. Various output configurations are possible and the present rotor 10 is not limited to any specific output configuration. It is envisioned that the geared end may include a bevel gear, a hypoid gear, or any other connection to translate torque in the art.

Figure 4:
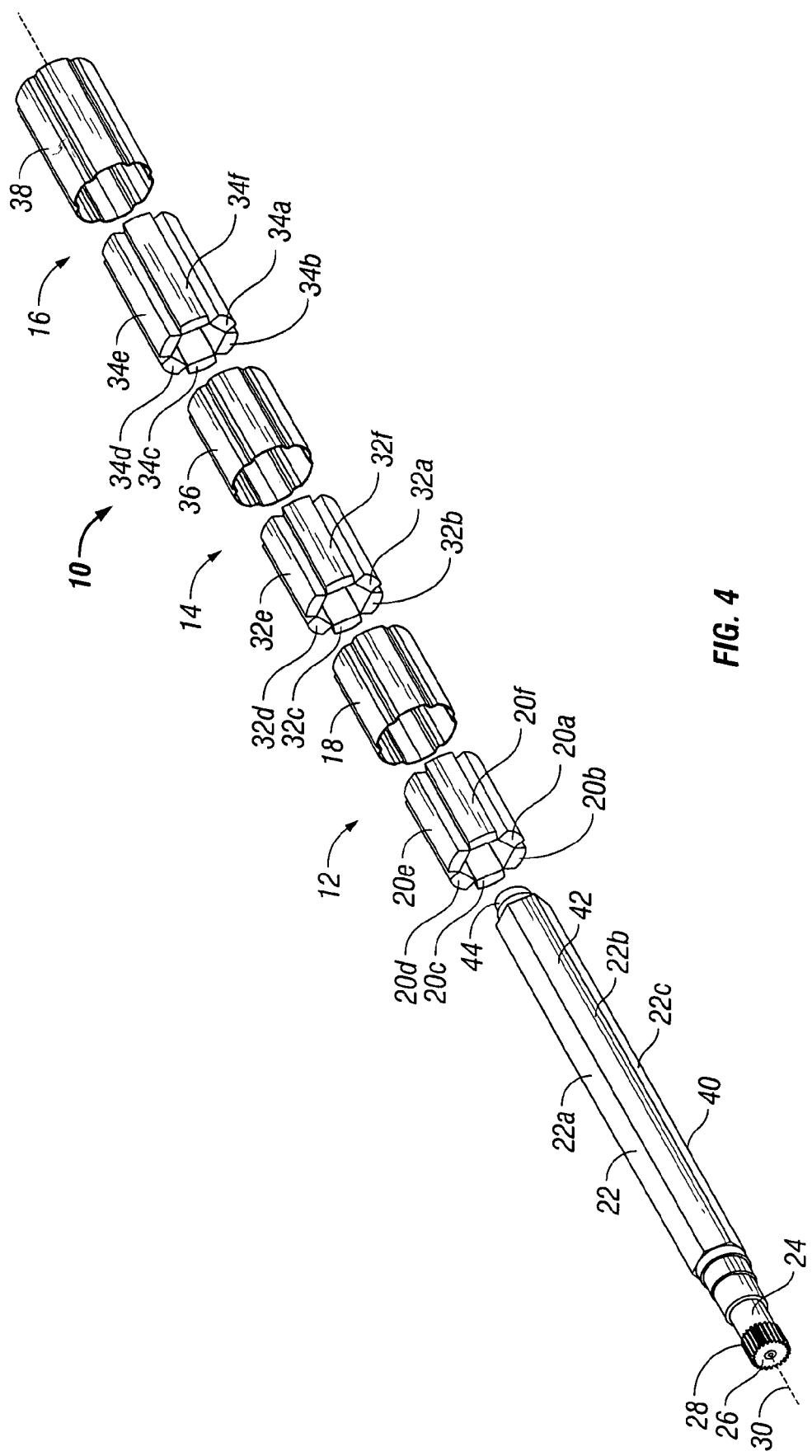
FIG. 4 shows an exploded view of the rotor according to the present invention.

FIG. 2 shows a side view of the rotor 10 that illustrates that the rotor 10 is a polyphase brushless direct current rotor having an "in-runner" configuration, where the stator 100 (FIG. 7) and windings of the stator 100 are placed around the rotor 10. In this aspect, the rotor 10 includes three phases, or a first phase 12, a second phase 14 and a third phase 16. The second and third phase 14, 16 have permanent magnets supported in a similar configuration to the first phase 12 discussed above. In this aspect, the second phase 14 and the third phase 16 also include six permanent magnets 32a through 32f and 34a through 34f also disposed in an alternating polarity configuration (FIG. 4).

Moreover, the second phase and the third phase 14, 16 are supported in a similar fashion using a pair of crimped sheaths 36, 38. Here, the rotor 10 include a first sheath 18, a second sheath 36, and a third sheath 38 to retain the permanent magnets on the receiving outer surface 22 of a rotor output shaft 40.

In operation, the first sheath 18, the second sheath 36, and the third sheath 38 retain the permanent magnets 20a through 20f, 32a through 32f, and 34a through 34f on the rotor output shaft 40. Preferably, the rotor output shaft 40 includes a planar face 22a, 22b, 22c, and 22d, 22e and 22f (not shown) for each of the permanent magnets of the second and third phases 14, 16. The sheaths 18, 36, and 38 preferably are each segments of a unitary material. Sheaths 18, 36, 38 are each generally cylindrical in shape and thin to permit the shaft to rotate. Each sheath 18, 36, and 38 surrounds or substantially surrounds each of the magnets 20a through 20f, 32a through 32f, and 34a through 34f in a collared arrangement. The sheaths 18, 36, 38 retain the permanent magnets 20a through 20f, 32a through 32f, and 34a through 34f in a stationary manner on the rotor output shaft 40. Each sheath 18, 36, and 38 is made from a resilient crimped material that is thin and lightweight, and may be rotated in a rapid manner without disturbing the orientation of the magnets. In one aspect, each sheath 18, 36, and 38 is a thin non-magnetic material to minimize a gap between the stator 100 and the permanent magnets 20a through 20f, 32a through 32f, and 34a through 34f, while also being very resilient to rotate at a relatively high rate of revolutions per minute while supporting the permanent magnets 20a through 20f, 32a through 32f, and 34a through 34f on the rotor output shaft 40.

In one embodiment, the sheaths 18, 36, and 38 are made from a thermoplastic material. In another embodiment, the sheaths 18, 36, and 38 are made from a non-magnetic material so as not to interfere with the electromagnetic flux between the permanent magnets 20a through 20f, 32a through 32f, and 34a through 34f and the windings of the stator 100. In one embodiment, the sheaths 18, 36 and 38 may be made from a flat piece of material that is folded over the permanent magnets 20a through 20f, 32a through 32f, and 34a through 34f to form a cylindrical collar using an automated or manual apparatus. In another alternative embodiment, the sheaths 18, 36 and 38 may be made as a cylindrical collar and then subsequently applied or affixed to the motor output shaft 40. The cylindrical collar 18, 36, 38 can be slid over the permanent magnets 20a through 20f, 32a through 32f, and 34a through 34f and slid over the receiving face 22 of the rotor output shaft 40 in a manual or automated manner. In another alternative embodiment, the receiving face 22 of the rotor output shaft 40 may include an adhesive material, or discrete connector to connect the magnets to the output shaft 40. The adhesive may further permit the permanent magnets 20a through 20f, 32a through 32f, and 34a through 34f to be connected to the receiving face 22 in a sturdy manner in addition to being connected to the face 22 by the sheaths 18, 36, 38.

It should be appreciated that the magnets may be placed on the rotor 10 before the respective sheath 18, 36, 38, or together with the sheath, 18, 36, 38, or even placed on after the sheath is placed on the rotor output shaft 40. Various sheath assembly configurations are possible. In each embodiment, the crimped sheaths 18, 36 and 38 include a thin thickness that is complementary to a thickness of the material forming the sheaths 18, 36, and 28. In one embodiment, the thickness can be a gauge thickness of several millimeters or any other gauge thickness known in the art to maximize the flux between the windings and the magnets.

Figure 7:
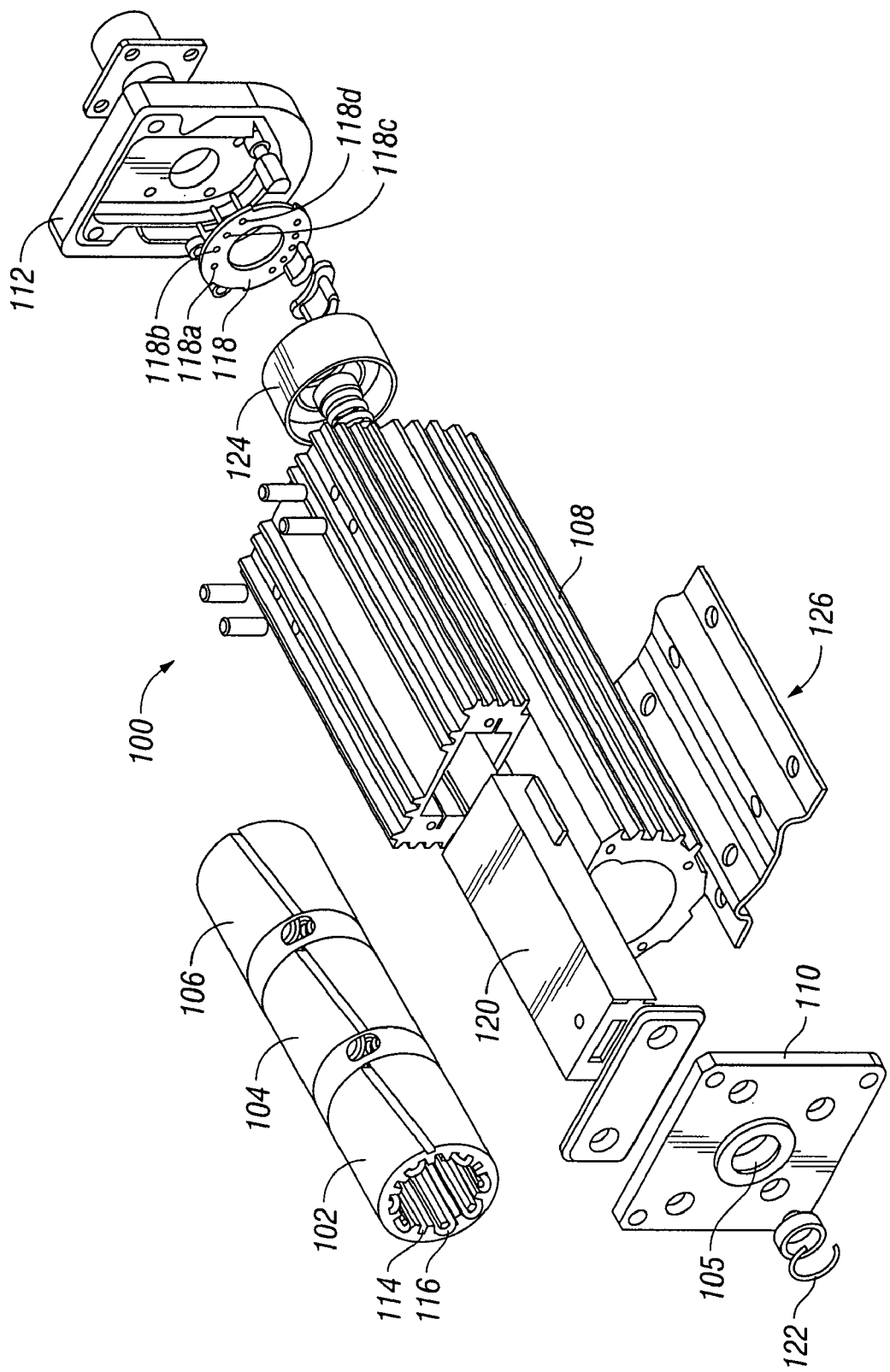
FIG. 7 shows a first embodiment of the stator in an exploded view.

Shown in FIG. 4, the rotor 10 is configured to be used with a brushless direct current motor, and the rotor output shaft 22 includes a proximal end 42 that has a rotatable support surface 44 that is configured to be supported in the stator 100 by a bearing 124 (FIG. 7). The polarity reversal of each of the three phases 12, 14, 16, in order to rotate that rotor 10, is performed by plural power transistors that switch in a manner that is substantially synchronized with a detected rotor position. Therefore, the present rotor 10 may be configured for use with, or include a position sensor to sense the actual rotor position. Such as sensor may include a Hall effect sensor (not shown) or the like, discussed later, in detail, with FIG. 7. The rotor 10 is driven by rectangular voltage strokes coupled with the given rotor position. The generated stator 100 flux interacts with the rotor 10 electromagnetic flux, which is generated by the permanent magnets 20a through 20f, 32a through 32f, and 34a through 34f of the three phases 12, 14, 16. This defines the torque and, thus, the overall speed of the motor. The voltage strokes must be properly applied to the two phases of the three-phase 12, 14, 16 winding system of the stator 100 so that the angle between the stator 100 flux and the rotor 10 flux is kept close to 90° to get the maximum generated torque.

The first through third sheaths 18, 36, 38 preferably reduce a gap distance measured between the stator 100 and the permanent magnets 20a through 20f, 32a through 32f, and 34a through 34f. This maximizes a magnetic flux between the stator 100 and the permanent magnets 20a through 20f, 32a through 32f, and 34a through 34f of the rotor 10. In this aspect, the sheaths 18, 36, and 38 include a reduced profile and reduced thickness, and alternatively, may be manufactured as one crimped sheath that extends along the length of the rotor output shaft 40 for ease of installation.

In another alternative embodiment, one sheath 18 may cover permanent magnets of multiple phases 12, 14, 16, such as, for example, the first phase and the second phase 12 and 14, while another sheath 38 covers only the third phase 16. In yet another embodiment, the second sheath 36 may cover both the second phase 14 and the third phase 16, while the first sheath 18 covers the first phase 12. Various sheath configurations are possible and within the scope of the present disclosure, and it should be appreciated that in each configuration, any of the sheaths 18, 36, and 38 include a configuration to position the permanent magnets 20a through 20f, 32a through 32f, and 34a through 34f closely adjacent to the windings of the stator 100 to maximize exposure of the magnets to the produced electromagnetic force.

Turning now again to FIG. 3, there is shown a front view of the rotor 10 showing the output gear 28. As can be seen the sheath 18 is a lightweight structure and surrounds the permanent magnets 20a, 20b, 20c, 20d, 20e, and 20f of the first phase 12, so the magnets 20a, 20b, 20c, 20d, 20e, and 20f are positioned in a radial manner surrounding the rotor output shaft 40. Preferably the weight of the sheaths 18, 36, 38 is a fraction of the weight of the entire rotor 10. Moreover, the thickness of each of the permanent magnets 20a, 20b, 20c, 20d, 20e, and 20f is substantially greater than a thickness of the sheath 18 to minimize a parasitic effect of the sheath 18 on the magnetic flux between the permanent magnets 20a, 20b, 20c, 20d, 20e, and 20f and the stator windings.

Turning now again to FIG. 4, there is shown a cross sectional view of the rotor 10 according to the present disclosure. In another embodiment, the rotor 10 is configured to include the first phase 12 offset a predetermined radial amount from the second phase 14, and the third phase 16 offset the predetermined radial amount from the second phase 14. In this embodiment, the polarity of the permanent magnet segments 20a through 20f, 32a through 32f, and 34a through 34f on the rotor 10 can be varied, in order to optimize power, load, or other characteristics of the rotor 10. In another aspect, at least one magnet may be heat resistant, or include an insulating material (not shown) disposed between the receiving face 22 and the magnet, or alternatively insulation located between the respective magnet and the respective sheath 18, 36, 38 to protect the magnet from excessive heat during operation.

Figure 5:
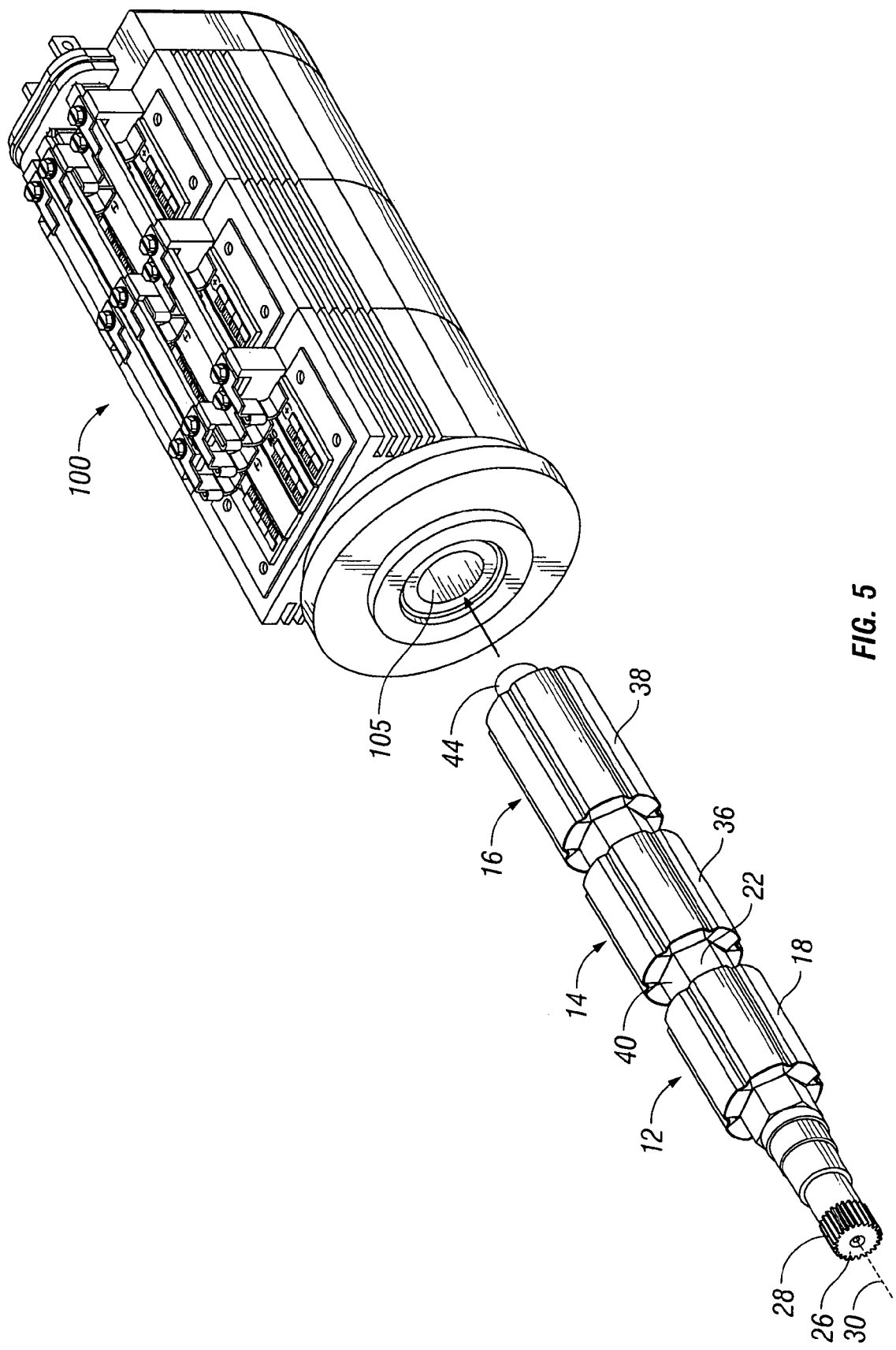
FIG. 5 shows a perspective view of the rotor of FIG. 1 extended from a stator and forming an electric motor.
Figure 6:
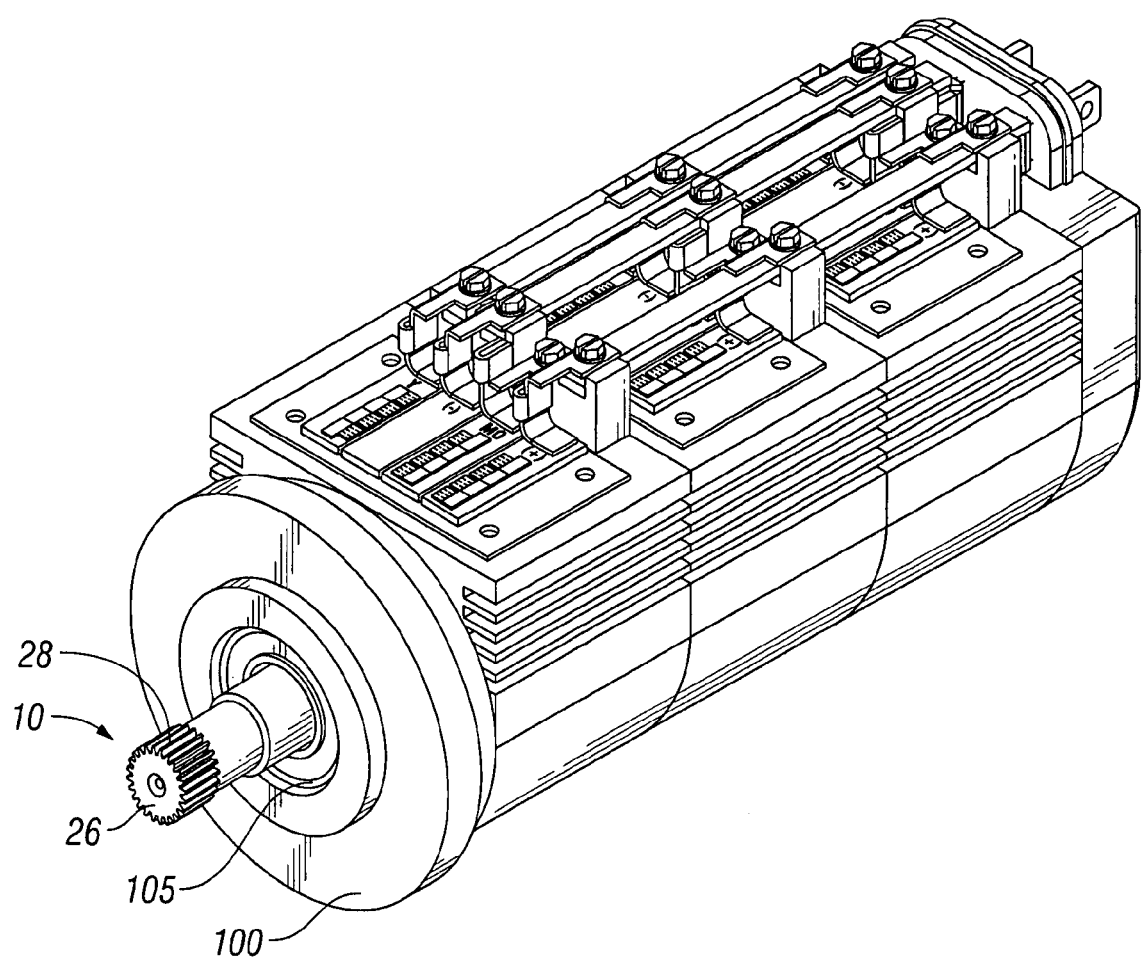
FIG. 6 shows the rotor rotatably supported in the stator.

The rotor 10 further includes that the first sheath 18 includes a length that is complementary to cover magnets 20a through 20f over the rotor output shaft 40 and hold the magnets 20a through 20f in a fixed stationary manner relative to the output shaft 40. The second sheath 36 also covers the first through sixth magnets 32a through 32f of the second phase 14, 16 in a fixed manner relative to the output shaft 40 along a length thereof. The third sheath 38 also covers the first through sixth magnets 34a through 34f adjacent to the second phase 16 in a fixed manner relative to the rotor output shaft 40 along a length thereof. In another embodiment, the sheaths 18, 36, 38 may only cover a fraction of the length of the permanent magnet, and can be formed as a ring-like member. Turning now to FIG. 5, there is shown the rotor 10 separated from the stator 100. The rotor 10 is supported in a stator 100, as shown, such that the stator 100 produces an electromagnetic flux that mechanically rotates the rotor 10. The stator 100 includes a entrance 105 and the rotor 10 is disposed in the entrance 105 of the stator 100 as shown in FIG. 6.

The stator 100 is shown in detail in FIG. 7 in an exploded view. In this view, the stator 100 includes several independent stator sections, or in this particular embodiment three stator sections 102, 104, and 106 with one section for each operating phase, or a first phase A, a second phase B, and a third phase C for the brushless direct current motor. Phases A, B, and C generally correspond to the rotor phases 12, 14, and 16 previously described above for the rotor 10. The stator 100 and the rotor 10 are supported relative to one another by a motor housing 108 that includes a first end plate 110, and a second end plate 112. The housing 108 and the end plates 110, 112 are preferably held in place and are made by a rigid material, such as, aluminum or a metal, or another inexpensive, but rigid material and by one or more bolts, screws, or discrete connectors.

The stator sections 102, 104 and 106 include a cylindrical configuration that includes a cylindrical section having an outer surface and an inner surface. The inner surface includes a number of internally formed notches 114. Positioned in the notches 114 are a number of windings 116. The windings 116 are preferably made from an electrically conductive material, such as, copper or any other electrically conductive material known in the art. The stator sections 102, 104 include a back iron assembly that is configured to be made from several flat laminated disks; however, it should be appreciated that the rotor 10, alternatively, may be configured for use with any stator 100 known in the art.

In a three phase, or polyphase operation, each of the sections 102, 104, and 106 is configured to provide at least one phase of the motor, and corresponds to the first through third phases 12, 14, and 16 of the rotor 10. The stator 100 also includes windings 116 suitable for a single phase 12, 14, 16 in each of the stator sections 102, 104 and 106. In one embodiment, the windings 116 may form a number of turns in the stator sections 102, 104, and 106. In one embodiment, the turns may include six wire turns. Alternatively, the turns may include three wire turns. Various winding 116 configurations and materials are possible and within the scope of the present disclosure and the present stator 100 or rotor 10 is not limited to any specific number of winding turns.

As mentioned above, the stator 100 requires positional information in order to determine the position of the respective phases 12, 14, 16 of the magnets 20a through 20f, 32a through 32f, and 34a through 34f. The stator 100 then controls the respective first through third phases of the stator 102, 104, 106. The stator 100 energizes the respective windings 116 on the respective stator section 102, 104, 106 and drives rotor 10. In this regard, the stator 100 further includes a Hall effect sensor 118. The Hall effect sensor includes a plurality of Hall effect transducers 118a, 118b, 118c, 118n that are arranged in a circular pattern to determine a position of the permanent magnets 20a through 20f, 32a through 32f, and 34a through 34f. The data signal from the sensor 118 is communicated to a driving circuit 120. In response, the driving circuit 120 feeds a control current to the windings 116 to energize the rotor 10. In one embodiment, optical sensors (not shown) may be used instead of the Hall effect sensor 118. Various sensor configurations are possible and within the scope of the present disclosure. Additionally, the Hall effect sensor 118 may be also configured to output a signal to provide a tachometer output signal of the speed of the rotor 10.

The stator sections 102, 104, 106 preferable are offset by a predetermined amount relative to one another in a radial manner. In one embodiment, the predetermined amount may be about ten degrees. In another embodiment, the stator sections 102, 104, 106 may be offset relative to one another by different radial amounts to further provide efficient operation. In another embodiment, each stator section 102, 104, 106 may be offset by different amounts relative to one another.

The stator 100 further includes a bearing 122 that cooperates with a second bearing 124 to support the rotor 10 in a rotatable fashion in the stator 100 in the brushless direct current "in-runner" configuration. Bearings 122, 124 preferably may be high output bearings that permit high torque and longevity. Bearing 122 is preferably positioned at the circular shaped entrance 105 of the housing 108 of stator 100 and the bearing 124 is positioned at the opposite end to cooperate with end 44 of the rotor 10 shown in FIG. 5. The stator 100 further includes a support plate 126. Plate 126 is disposed as a bottom of housing 108 and preferably provides for support of the stator 100 on a surface for electric motorized operation. Plate 126 is rigid and includes a configuration for easy and quick connection and disconnection from a surface.

Figure 8:
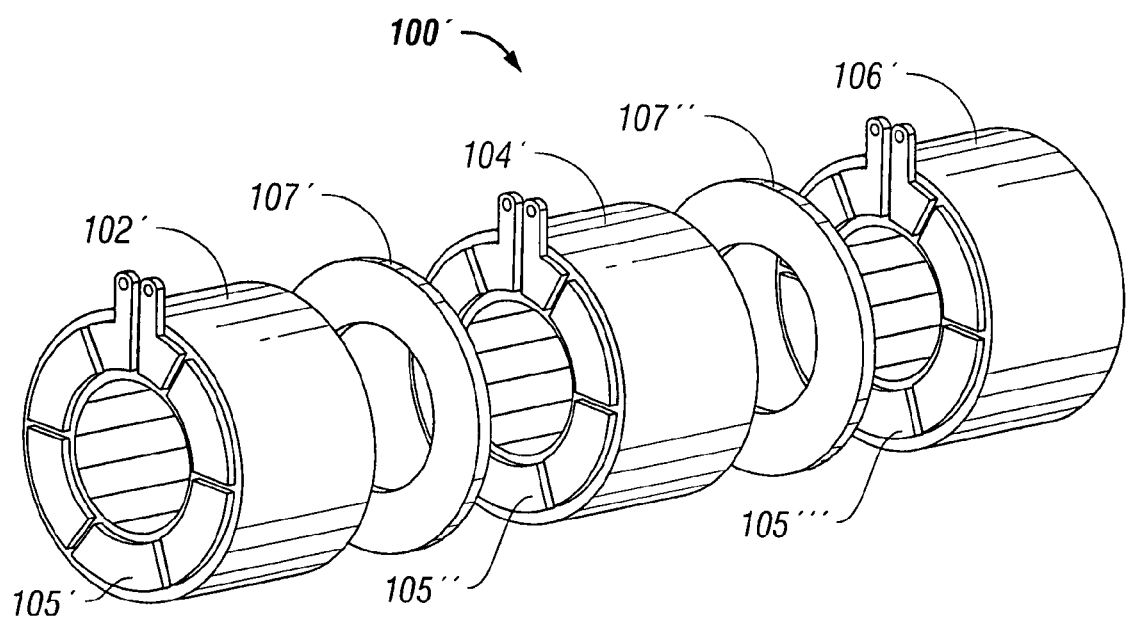
FIG. 8 shows a second different embodiment of the stator of FIG. 7 in an exploded view.

Turning now to FIG. 8, there is shown an additional stator 100' according to another embodiment of the present invention configured for use with the rotor 10 of FIG. 1. In this embodiment, the stator 100' includes interconnect disks 105', 105''', and 105''' at each end of the respective stator 100' sections 102', 104', 106' that provide connectivity to create the windings 116. Insulating disks 107, and 107'' are placed between each of the stator sections 102', 104' and 106' in order to permit the stator 100' to remain electrically isolated. In this embodiment, the stator 100' may be provided with blades as described in U.S. Pat. No. 6,538,356, which is herein incorporated by reference in its entirety.

In the embodiment of FIG. 8, the first stator section 102' (configured for the first phase 12 of the rotor 10 of FIG. 1) can be configured to be rotated or offset a radial amount relative to the position of the second stator section 104'. This amount may be about ten degrees. The third stator section 106' is further configured to be offset from the second stator section 104' by another ten degrees, or twenty degrees from the first stator section 102'.

A three phase motor should have about a hundred twenty degrees phase shift between each of the three phases, with each of the stator sections 102, 104' and 106' being offset about ten degrees from one another. In yet another embodiment, the three phases of the rotor 12, 14 and 16 may also be offset by another a predetermined radial amount relative to one another to optimize performance.

Rotor embodiments may be used in a variety of different possible applications, and provide advantages in efficiency, power consumption, torque, and thermal performance. In some applications, such as vehicle applications, it may be useful to have one or more of the stator sections 102', 104', 106' configured for power, one or more used as a generator, and/or one more used for braking. Combining such different use of the stator sections 102', 104' and 106' may, for example, be used to enable regenerative braking (for instance by using two sections for power, and one for braking). In vehicle and other high-power applications, the improved thermal performance resulting from the improved packing geometry of separate rotor 10 and stator sections 102', 104', 106' according to an embodiment of the present disclosure allows for a high-powered motor to run continuously. By contrast, a conventional multiple-phase electric motor, with multiple phases on a single stator 100', needs to be run intermittently in order to provide sufficient time for cooling the motor off. This provides for an advantage, for example, for high-powered vehicle applications, in which continuous operation is a necessity this allows a permanent magnet brushless DC motor to be competitive with gas-powered engines. It should be appreciated that the rotor 10 and stator 100 may be configured to output a fraction of a watt to many kilowatts, or an output as large as about a 100 kw rating for an electric vehicle. Various ratings are possible and within the scope of the present disclosure.

Separate stator sections 102', 104', 106', according to an embodiment of the present disclosure, may also provide advantages and ease of manufacture, particularly for an internally-wound motor, since each stator section 102', 104', 106' needs to be wound with only one phase of windings 116 instead of having to carefully wind multiple phases on the same stator. However, this configuration is not limiting.

Various driving circuits may be used in connection with the present rotor 10, and the following is only an illustrative description of such a driving circuit 120. Turning again to FIG. 7, preferably the driving circuit 120 of the stator 100 includes logic and timing circuitry connected to ground. The driving circuit 120 also has high and low drivers and MOSFETs also connected to a low power current sense that is also connected to ground. The logic and timing circuitry is also connected to high and low drivers and MOSFETs. The high and low drivers and MOSFETs are also connected to the Hall effect sensor 118, or alternatively to an optical sensor, to determine a position of the permanent magnets 20a through 20f, 32a through 32f, and 34a through 34f of the rotor 10. The Hall effect sensor 118 may output the detected signal to the high and low drivers and MOSFETs, and the high/low drivers may supply the signal to the windings 116 of the particular stator phase 102, 104, and 106. The control circuit and the timing circuit may further be connected to a forward/reverse dial, or button to further control forward or reverse operation of the rotor 10. Driver circuit 120 can further be connected to an on/off switch (not shown). Control circuit and the timing circuit is also connected to a suitable "voltage out" lead, while the high and low drivers and MOSFETs are connected to a "voltage in" lead.

While this invention has been particularly shown and described with references to example embodiments thereof, it will be understood by those skilled in the art that various changes in form and details may be made therein without departing from the scope of the invention encompassed by the appended claims.

What is claimed is:

1. A rotor having a substantially cylindrical configuration for use in a brushless direct current electric motor having a high torque to size ratio, said rotor having an outer peripheral surface, the rotor comprising:

a central rotor shaft having first through sixth receiving surfaces;

a first phase of magnets configured to provide a magnetic flux with a stator with the first phase of magnets including at least six magnets radially disposed around each of the first through sixth receiving surfaces of the central rotor shaft at a first location;

a second phase of magnets configured to provide a magnetic flux with the stator with the second phase of magnets including at least six magnets radially disposed around each of the first through sixth receiving surfaces of the central rotor shaft at a second location that is spaced from the first location;

a third phase of magnets configured to provide a magnetic flux with the stator with the third phase of magnets including at least six magnets radially disposed around each of the first through sixth receiving surfaces of the central rotor shaft at a third location being spaced from the second first location with the second location being between the first and the third locations; and a collared device configured to retain each of the first through third phases of magnets on the central rotor shaft and provide a minimum gap distance between the first through third phases of magnets and a winding of the stator for rotation of the central rotor shaft.

2. The rotor of claim 1, wherein the collared device is a sheath that radially extends around at least a portion of the central rotor shaft.

3. The rotor of claim 1, wherein the collared device further comprises a first crimped sheath that substantially surrounds the first phase of magnets.

4. The rotor of claim 3, wherein the collared device further comprises a second crimped sheath that substantially surrounds the second phase of magnets.

5. The rotor of claim 4, wherein the collared device further comprises a third crimped sheath that substantially surrounds the third phase of magnets.

6. The rotor of claim 1, wherein the first through third phases of magnets are permanent magnets in an alternating north-south configuration.

7. A brushless direct current electric motor having a high torque to size ratio, the motor including a rotor having a central longitudinal axis of rotation, a stator defining a centrally located longitudinal opening and a bearing for supporting the rotor in the stator and for allowing the rotor to rotate about the central longitudinal axis of rotation, the electric motor comprising:

a central rotor shaft having first through sixth receiving surfaces;

a first phase of magnets configured to provide an electromagnetic flux with the stator with the first phase of magnets including at least six magnets disposed around each of the first through sixth receiving surfaces of the central rotor shaft at a first location;

a second phase of magnets configured to provide an electromagnetic flux with the stator with the second phase of magnets including at least six magnets disposed around each of the first through sixth receiving surfaces of the central rotor shaft at a second location that is spaced from the first location;

a third phase of magnets configured to provide an electromagnetic flux with the stator with the third phase of magnets including at least six magnets disposed around each of the first through sixth receiving surfaces of the central rotor shaft at a third location being spaced from the second first location with the second location being between the first and the third locations; and a plurality of sheaths configured to retain each of the first through third phases of magnets on the central rotor shaft, the sheaths providing a minimum gap distance measured between the first through third phases of magnets and the stator for the electromagnetic flux between stator windings and the first through third phases and to provide rotation of the central rotor shaft.

8. The electric motor of claim 7, wherein each of the first through third phases of magnets is directly connected to the respective first through sixth receiving surfaces.

9. The electric motor of claim 8, wherein each of first through third phases of magnets is offset from one another by a predetermined radial amount, and, wherein the magnets are heat resistant, and held in place by the respective plurality of sheaths in the offset configuration.

* * * * *